April 11, 1961 L. S. SUOZZO 2,979,297
COMBINED SUPPORT AND SHOCK ABSORBER FOR PIPING AND THE LIKE
Filed May 20, 1959 2 Sheets-Sheet 1

INVENTOR.
LEONARD S. SUOZZO
BY F. J. Pisarra
ATTORNEY

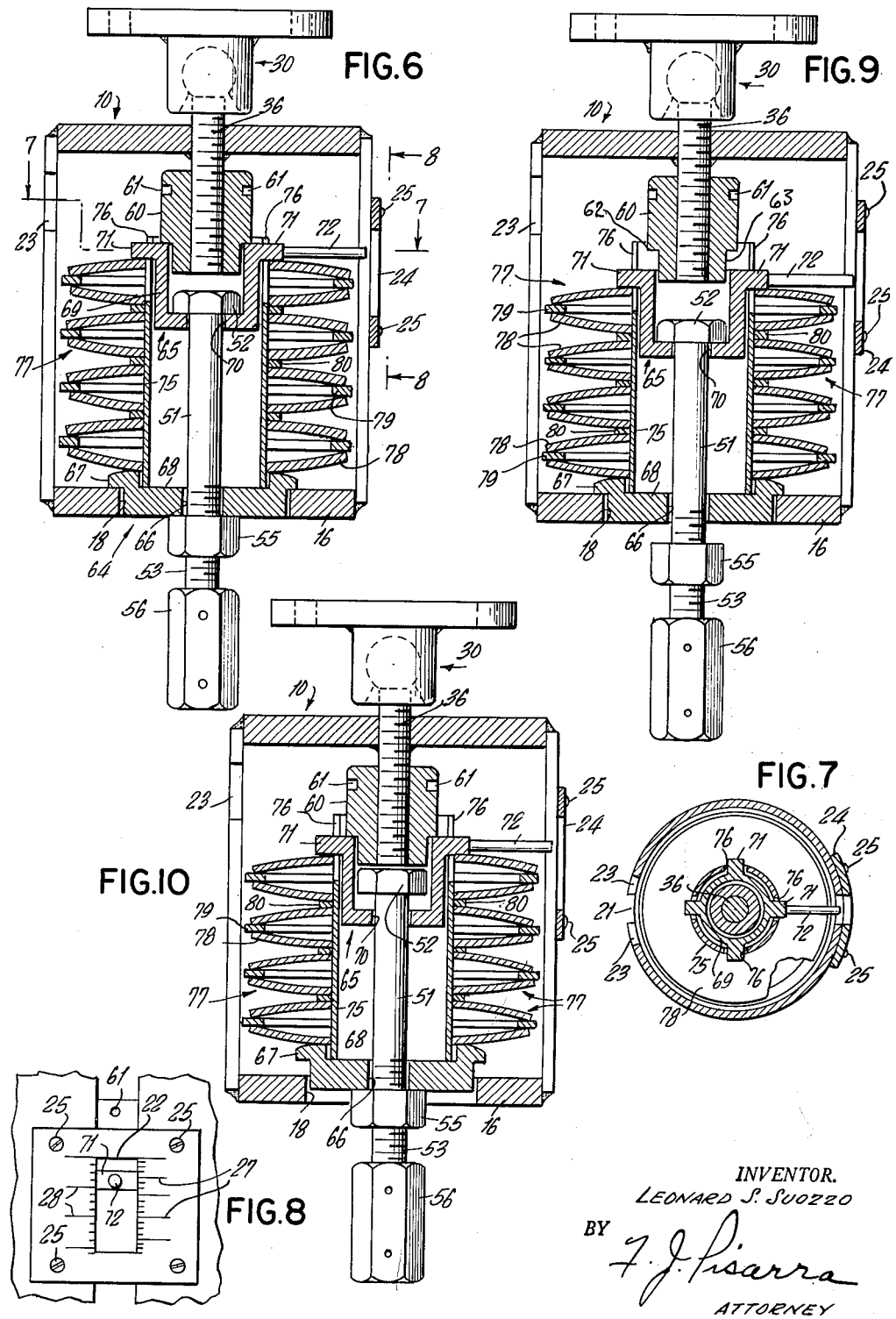

United States Patent Office 2,979,297
Patented Apr. 11, 1961

2,979,297
COMBINED SUPPORT AND SHOCK ABSORBER FOR PIPING AND THE LIKE

Leonard S. Suozzo, Hackensack, N.J., assignor to Bergen Pipesupport Corp., New York, N.Y., a corporation of New York Filed May 20, 1959, Ser. No. 814,493
9 Claims. (Cl. 248—54)

This invention relates to a spring device for supporting various loads and, more particularly, to a device for yieldingly supporting piping and the like and for absorbing shock forces developed in the piping during use.

The device of this invention has wide application and may be advantageously employed to support various types of piping systems that carry steam or other fluids at high temperatures and pressures. One field in which the device is especially useful is that of marine piping systems where the piping develops vertical shock forces, that may act upwardly or downwardly, and lateral shock forces that are due to vibrations in the piping during use.

It has generally been the practice heretofore to provide marine piping systems with a conventional spring hanger that is arranged vertically to carry the load and a pair of sway braces to absorb certain of the shock forces created in the piping. The sway braces are usually arranged to opposite sides of the hanger and at corresponding 45° angles to the horizontal. The device of this invention is used in place of a conventional spring hanger and eliminates the need for at least one of the sway braces. This results in substantial cost economies, weight reduction and savings in valuable space.

This invention constitutes a worthwhile advance in the art in that it embodies several important features which contribute materially to its utility. Among such features are:

(1) A single spring means serves the dual function of yieldingly supporting piping and absorbing shock forces developed in the piping during use. The spring means may consist of a helical compression spring or one or more disc springs. In either case, the spring means is properly guided, thereby resulting in smooth, quiet and trouble-free operation.

(2) The housing for the device also contains a load adjusting means for varying the loading on the spring means and associated parts. Thus the load adjusting means is protected against damage to its threads and other parts during handling and against tampering while in active use. The load adjusting means is accessible through a window which is provided in the housing side wall. This window permits visual examination of the parts within the housing at the times of manufacture and installation, and during use. Dust, dirt or other foreign material that may enter the interior of the housing may be readily detected and removed through the window.

(3) The device may be readily pre-set at "cold position" at the factory and subsequently adjusted at "hot position" at the time of installation. This simplifies handling and installation in the field.

(4) The device is provided with a universal or swivel type connection that is secured to the top wall of its housing. This connection is preferably in the nature of a ball and socket joint and is so constructed and arranged as to provide adequate flexibility with minimum space requirement.

The primary object of the invention is to provide a spring support for piping or the like having improved features of design and construction.

Another object of the invention is to provide a combined spring support and shock absorber including a housing having at least one window which affords ready access to a load adjusting means positioned within the housing and which permits of inspection of parts within the housing and convenient removal of dust or other foreign particles that may become deposited in the housing during use.

A further object of the invention is to provide a support for piping including a single spring means which serves the dual function of yieldingly and adequately supporting the piping and effectively absorbing shock forces developed in the piping during use.

The invention has for a still further object the provision of a combined spring support and shock absorber that is simple and compact in design, that is rugged and durable in construction, that is reasonable in manufacturing cost, that is adapted to be readily installed and that is capable of performing its intended functions in a dependable and satisfactory manner.

The enumerated objects and other objects, together with the advantages of the invention, will be understood by persons trained in the art upon reference to the following detailed description, taken in conjunction with the accompanying drawings, which respectively describe and illustrate two forms of devices embodying the invention.

In the drawings, wherein like reference numerals denote corresponding parts throughout the several views:

Fig. 6 is similar to Fig. 1 and illustrates another form of the invention;

Fig. 7 is a view on a reduced scale taken along staggered line 7—7 of Fig. 6;

Fig. 8 is an enlarged fragmentary view taken along line 8—8 of Fig. 6;

Fig. 9 corresponds to Fig. 6 and illustrates certain of the parts in another relative position; and Fig. 10 also corresponds to Fig. 6 and illustrates certain of the parts in still another relative position.

Figure 1:
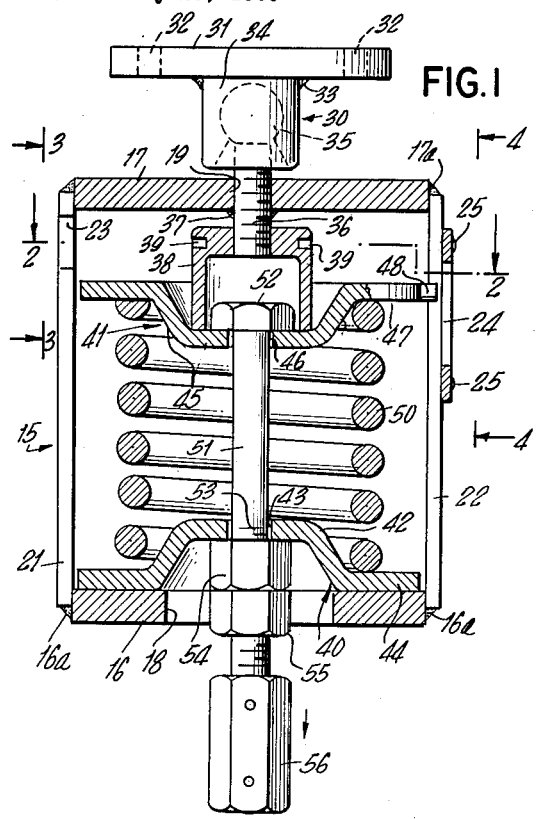
Fig. 1 is a view in central vertical cross-section of one form of device constructed in accordance with this invention.
Figure 5:
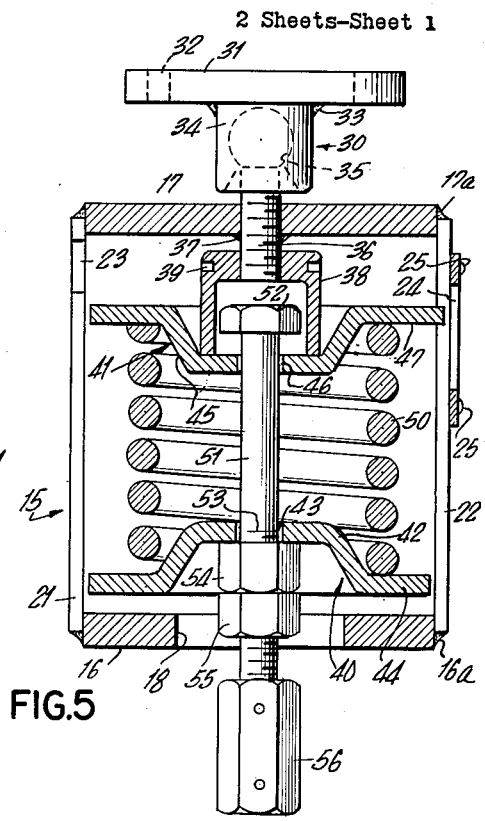
Fig. 5 is a view corresponding to Fig. 1 and illustrates certain of the parts in another relative position.
Figures 2, 3, 4:
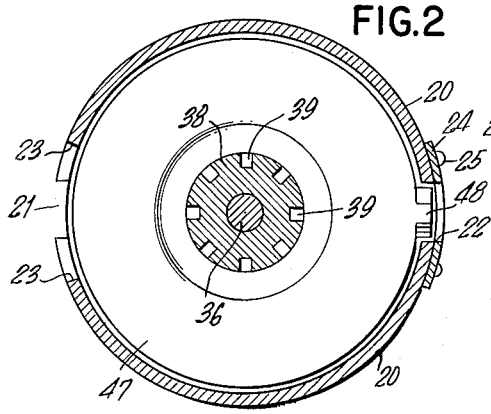
Fig. 2 is a view taken along staggered line 2—2 of Fig. 1.
Fig. 3 is an enlarged fragmentary view taken along line 3—3 of Fig. 1.
Fig. 4 is an enlarged fragmentary view taken along line 4—4 of Fig. 1.

Referring initially to Figs. 1 through 4 of the drawings, a housing, which is generally indicated by numeral 15, includes circular and parallel bottom and top walls 16 and 17, respectively. The bottom wall has a central through opening 18 while the top wall has a central tapped through opening 19. The housing also includes a pair of spaced-apart vertical walls 20 which are arcuate in transverse cross-section, as shown in Fig. 2. The side walls are welded to the bottom wall, as indicated at 16a, and to the top wall, as indicated at 17a, to obtain a rigid structure. The top, bottom and side walls are so configured and arranged as to define a pair of oppositely disposed windows 21 and 22 that extend the full effective height of the housing. Opposing portions of the side walls that define window 21 are recessed, as denoted at 23 (Fig. 3), to form an enlarged opening for the reception of a suitable tool for adjusting parts, to be described, that are positioned within the housing.

An indicator plate 24 is mounted on the outer faces of the side walls by screws 25. The indicator plate has an elongated vertical slot 26 which is aligned with window 22 (Fig. 4). This plate is provided with a first scale having graduations 27 for indicating the load carried by the device and a second scale having graduations 28 for indicating the load travel distance.

The housing is adapted to be suspended from a support, such as an overhead beam (not shown), by a universal connector unit 30 which includes a mounting plate 31 having a plurality of drill holes 32 for receiving bolts or the like (not shown) whereby to secure the plate to the support. Welded to the under side of plate 31, as indicated at 33, is a tubular socket 34 which forms a universal or swivel connection with spherical head 35 of a threaded rod 36. This rod engages tapped opening 19 in the housing top plate and projects into the interior of the housing. At the time of assembly, rod 36 is permanently affixed to the housing top wall by a weldment 37 to prevent movement of the rod relative to the housing.

A hollow load adjusting member 38 is positioned wholly within housing 15 and is threadedly connected to rod 36. The adjusting member is preferably cylindrical and is provided with a plurality of circumferentially spaced, radial, blind bores 39 for reception of a suitable tool to effect turning relative to rod 36. The tool (not shown) is introduced into the housing by way of window 21 and recesses 23 (Fig. 3) and caused to enter one or more bores 39. It will be evident from an examination of Figs. 1, 2 and 3 that, when the load adjusting member is turned in one direction, it moves upwardly relative to rod 36 and, when it is turned in a reverse direction, it moves downwardly relative to the rod.

Also positioned within the housing is a pair of movable plates, namely a lower movable plate 40 and an upper movable plate 41. Both of these plates are dished and lower plate 40 is inverted relative to upper plate 41. Plate 40 includes a frusto-conical central portion 42, having an axial through opening 43, and a laterally extending annular flange 44. Similarly, upper plate 41 includes a frusto-conical central portion 45, having an axial through opening 46, and a laterally extending annular flange 47. Opening 46 is aligned with opening 43. An indicator arm 48 is integral with flange 47 and registers with housing window 22 and indicator plate slot 26. Indicator 48 cooperates with the graduations 27 and 28 to denote the amount and travel of the load.

A helical compression spring 50 is interposed between the movable plates and bears against flanges 44 and 47. The movable plates are so configured and arranged as to maintain the spring in coaxial alignment with the openings in the plates.

A rod 51 is provided with a head 52 and a threaded lower portion 53. The rod extends freely through the openings in plates 40 and 41. Head 52 engages the upper side of plate 41. A load nut 54 is threadedly connected to rod 51 and engages the lower side of plate 40. A lock nut 55 maintains load nut 54 in selected position. A threaded load coupling sleeve 56 engages the lower end of rod 51 and is adapted to be connected to piping or the like.

For the purpose of briefly discribing the operation of the device shown in Figs. 1 through 5, it is assumed that the device is assembled and that the parts are in the relative position shown in Fig. 1. With the parts in this position, the device is pre-set to cold load position by setting the loading on spring 50 to the desired value by turning adjusting member 38. This is preferably done at the factory at the time of assembly. Nut 54 is then adjusted to the illustrated position (Fig. 1) and lock nut 55 is tightened.

At the time of installation, unit 30 is secured to a support beam or the like and load coupling sleeve 56 is connected to the piping. Minor adjustments, as required, may be made at the time of installation. Downward movement of the piping will cause corresponding downward movement of rod 51 and further compression of spring 50 as will be apparent from an examination of Fig. 1.

Any upward or similar shock forces are readily absorbed by the device. Upward movement of the piping will cause rod 50 to move upwardly a like distance and the parts will assume the relative position shown in Fig. 2, rod head 52 having moved upwardly into the interior of adjusting member 38 and lower movable plate 40 having been disengaged from and moved upwardly relative to housing bottom wall 16. When the shock force subsides, the parts return to the relative position shown in Fig. 1.

Reference is now had to the form of the invention shown in Figs. 6 through 10. This form is similar in many respects to that shown in Figs. 1 through 5. The principal difference resides in the utilization of disc springs in place of helical spring 50.

The construction shown in Figs. 6 through 10 includes an adjusting member 60 which corresponds to member 38. Member 60 has a plurality of circumferentially spaced, radial bores 61 which are the same in location and function as bores 39. Member 60 has an annular shoulder 62 which is defined in part by lower end portion 63 of reduced diameter.

The device includes a lower movable plate 64 and an upper movable plate 65 which correspond to earlier described plates 40 and 41, respectively. Lower plate 64 has an axial through opening 66 and is provided with a laterally extending annular flange 67 that normally bears against the upper side of housing bottom wall 16. This plate is provided with a circular recess 68 in its upper end.

Upper movable plate 65 includes a hollow cylindrical central portion 69, having an axial through opening 70, and a plurality of equi-spaced lateral extensions 71. An indicator pin 72 is carried by one of the extensions 71. This pin corresponds to and serves the same functions as earlier described indicator arm 48.

A guide tube 75 is interposed between plates 64 and 65 and registers with recess 68 in plate 64. The guide tube is coaxial with rod 36, adjusting member 60, rod 51, passage 70 in upper plate member 65, passage 66 in lower plate member 64 and opening 18 in housing bottom wall 16. The guide tube is provided with a plurality of guide slots 76 which extend downwardly from its upper end. Each slot 76 is adapted to receive a corresponding extension 71 of upper movable plate 65.

Positioned between flange 67 of lower movable plate 64 and extensions 71 of upper movable plate 65 is a plurality of spring units or assemblies 77. While four such units are shown to permit of desired axial travel of rod 51, it is to be understood that one or more units may be omitted, or additional units may be inserted, depending on the travel requirements of a particular device. Each spring unit is coaxial with and guided by guide tube 75. Each spring unit comprises a pair of oppositely disposed frusto-conical disc springs 78. Each disc spring is made of a suitable metal and is substantially uniform in thickness. Each spring unit includes a means for maintaining the portions of largest diameter of corresponding disc springs in spaced relation. Such a means may comprise a spacing ring 79. Other means, including an integral spacer, as disclosed in my pending application Serial No. 574,534, now Patent No. 2,939,663, granted June 7, 1960, may be used in lieu of spacing ring 79.

A spacing ring 80 is provided between each spring unit 77 and the next adjacent spring unit. Each of these rings bears against the portion of smallest diameter of pairs of disc springs, as shown. The illustrated arrangement of guide tube 75, springs 78 and spacing rings 79 and 80 permits the disc spring of each spring unit to be flexed beyond its flat position as will be apparent from an examination of the drawings and as is more fully explained in my said pending application Serial No. 574,534, to which reference may be had.

The form of the invention shown in Figs. 6 through 10 operates in substantially the same manner as that shown in Figs. 1 through 5. Fig. 6 illustrates the relative position of the parts when the load is in normal position. Fig. 9 illustrates the relative position of parts when the rod has moved downwardly. Fig. 10 illustrates the relative position of parts when the device is subjected to an upward shock force.

From the foregoing, it is believed that the objects, construction, operation and advantages of my present invention will be readily comprehended by persons skilled in the art, without further description. Although the invention has been herein shown and described in several simple and practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the appended claims.

I claim:

1. In a combined spring hanger and shock absorber for piping and the like, a housing including a top wall, a bottom wall having a through opening and at least one side wall, said housing having a window defined at least in part by the side wall a pair of vertically spaced transverse movable plates consisting of a lower movable plate at least partly within the housing and an upper movable plate wholly within the housing, each plate having a through opening which is aligned with the opening in the housing bottom wall, means within the housing for limiting downward movement of the lower plate, spring means disposed between and bearing against both plates, a rod slidable through the spring means and the openings in the plates and the housing bottom wall, means connected to the rod and engaging the upper side of the upper plate, means connected to the rod and engaging the lower side of the lower plate, and means wholly within the housing for varying the loading on the spring means, said last mentioned means comprising a threaded rod connected to the housing top wall and projecting into the interior of the housing, said threaded rod being substantially coaxial with the first mentioned rod, and a threaded tubular member engaging the threaded rod and bearing against the upper side of the upper plate said tubular member being accessible through the window.

2. A combined spring hanger and shock absorber according to claim 1 wherein the spring means comprises a helical compression spring which is substantially coaxial with the rod.

3. A combined spring hanger and shock absorber according to claim 1 wherein the spring means comprises at least one disc spring which is substantially coaxial with the rod.

4. In a combined spring hanger and shock absorber for piping and the like, a housing including a top wall, a bottom wall having a through opening and at least one side wall, a threaded first rod secured to the housing top wall, the upper portion of the rod extending beyond the exterior of the housing, the lower portion of the rod projecting into the interior of the housing, connector means forming a swivel connection with the upper portion of the rod and adapted to connect the rod to a support, a pair of vertically spaced transverse movable plates consisting of a lower movable plate at least partly within the housing and an upper movable plate wholly within the housing, each plate having a through opening which is aligned with the opening in the housing bottom wall, means within the housing for limiting downward movement of the lower plate, spring means disposed between and bearing against both plates, a second rod slidable through the spring means and the openings in the plates and the housing bottom wall, means connected to the second rod and engaging the upper side of the upper plate, means connected to the second rod and engaging the lower side of the lower plate, and means wholly within the housing for varying the loading on the spring means, said last mentioned means comprising a hollow member threadedly connected to the lower portion of the first rod and bearing against the upper side of the upper plate.

5. A combined spring hanger and shock absorber according to claim 4 wherein the housing is provided with a window that is defined at least in part by the side wall and wherein the hollow member is accessible through the window.

6. A combined spring hanger and shock absorber according to claim 4 wherein the spring means comprises at least one disc spring which has a central through opening and which is substantially coaxial with the rods.

7. A combined spring hanger and shock absorber according to claim 6 wherein the lower movable plate includes a first part which registers with the opening in the housing bottom wall and a second part which engages the upper side of bottom wall, said second part and the bottom wall constituting the means for limiting downward movement of the lower movable plates.

8. A combined spring hanger and shock absorber according to claim 6 including a guide tube which is substantially coaxial with the rods and the disc spring and which extends from the lower movable plate to the upper movable plate, said upper movable plate including at least one extension which registers with a slot in the guide tube, said guide tube and upper movable plate being so constructed and arranged as to permit of movement of that plate along the axis of the guide tube and prevent rotary movement of that plate relative to the guide tube.

9. A combined spring hanger and shock absorber according to claim 6 including a guide tube which is substantially coaxial with the rods and the disc spring and which extends from the lower movable plate to the upper movable plate, said upper movable plate including at least one extension which registers with a slot in the guide tube, said guide tube and upper movable plate being so constructed and arranged as to permit of movement of that plate along the axis of the guide tube and prevent rotary movement of that plate relative to the guide tube, the housing being provided with a window that is defined at least in part by the side wall, the hollow member being accessible through the window.

References Cited in the file of this patent

UNITED STATES PATENTS

| | | |
|---|---|---|
| 1,826,597 | Brecht | Oct. 6, 1931 |
| 2,372,214 | Loepsinger | Mar. 27, 1945 |

FOREIGN PATENTS

| | | |
|---|---|---|
| 792,093 | Great Britain | Mar. 19, 1958 |